United States Patent [19]
Rajaee

[11] Patent Number: 5,947,498
[45] Date of Patent: *Sep. 7, 1999

[54] MODULAR TELESCOPIC FRONT FORK ASSEMBLY

[75] Inventor: Babak Rajaee, Greenville, Del.

[73] Assignee: Tenneco Automotive Inc., Lake Forest, Ill.

[*] Notice: This patent is subject to a terminal disclaimer.

[21] Appl. No.: 09/127,304

[22] Filed: Jul. 31, 1998

Related U.S. Application Data

[63] Continuation of application No. 08/589,034, Jan. 19, 1996, Pat. No. 5,829,773.

[51] Int. Cl.⁶ .................................................. B62K 25/08
[52] U.S. Cl. ......................... 280/276; 267/177; 267/179
[58] Field of Search .......................... 180/219; 280/276, 280/277, 279, 280, 283; 267/175, 177, 179, 249, 140.2, 221

[56] References Cited

U.S. PATENT DOCUMENTS

| | | |
|---|---|---|
| 3,877,539 | 4/1975 | Tilkens . |
| 3,891,236 | 6/1975 | Kuwano et al. ........................ 280/283 |
| 4,057,264 | 11/1977 | Suzuki et al. . |
| 4,438,909 | 3/1984 | Matsumoto . |
| 4,441,593 | 4/1984 | Axthammer . |
| 4,455,032 | 6/1984 | Kajikawa . |
| 4,458,605 | 7/1984 | Herring, Jr. et al. . |
| 4,558,761 | 12/1985 | Boyesen . |
| 4,585,245 | 4/1986 | Rose . |
| 4,616,810 | 10/1986 | Richardson et al. . |
| 4,697,824 | 10/1987 | Tagami . |
| 4,721,322 | 1/1988 | Hawkins . |
| 4,786,037 | 11/1988 | Mills . |
| 4,821,983 | 4/1989 | Aubry et al. . |
| 4,830,348 | 5/1989 | Seyler . |
| 4,881,750 | 11/1989 | Hartmann . |
| 4,964,625 | 10/1990 | Kawamura . |
| 4,971,344 | 11/1990 | Turner . |
| 5,009,451 | 4/1991 | Hayashi et al. . |
| 5,022,501 | 6/1991 | Hayashi et al. . |
| 5,088,705 | 2/1992 | Tsai . |
| 5,098,120 | 3/1992 | Hayashi et al. . |
| 5,181,696 | 1/1993 | Abe . |
| 5,186,481 | 2/1993 | Turner . |
| 5,193,832 | 3/1993 | Wilson et al. . |
| 5,195,766 | 3/1993 | Dohrmann et al. . |
| 5,201,244 | 4/1993 | Stewart et al. . |
| 5,238,259 | 8/1993 | Wilson et al. . |
| 5,248,159 | 9/1993 | Moore . |
| 5,269,549 | 12/1993 | Wilson et al. . |
| 5,275,264 | 1/1994 | Isella . |
| 5,284,352 | 2/1994 | Chen . |
| 5,301,974 | 4/1994 | Knapp . |
| 5,320,374 | 6/1994 | Farris et al. . |
| 5,328,196 | 7/1994 | Ohma . |
| 5,346,236 | 9/1994 | Ohma . |
| 5,350,185 | 9/1994 | Robinson . |
| 5,359,910 | 11/1994 | Chang et al. . |
| 5,380,026 | 1/1995 | Robinson . |
| 5,382,037 | 1/1995 | Chang et al. ........................... 280/276 |
| 5,417,446 | 5/1995 | Pileggi . |
| 5,435,584 | 7/1995 | Buell . |
| 5,441,291 | 8/1995 | Girvin, III . |

Primary Examiner—Lanna Mai
Assistant Examiner—Avraham Lerner
Attorney, Agent, or Firm—Harness, Dickey & Pierce, PLC

[57] ABSTRACT

A modular telescopic front fork assembly which is adaptable to a wide range of applications is disclosed. The modular telescopic front fork assembly is utilized for a front of a vehicle having at least one front wheel. The modular telescopic front fork assembly includes a removable self-contained damper cartridge. This removable self-contained damper cartridge includes a housing and a reciprocating piston rod axially extending from the housing. A first securing mechanism steerably secures the housing of the self-contained damper cartridge to the front of the vehicle. A second securing mechanism secures the piston rod of the self-contained damper cartridge adjacent to the front wheel of the vehicle. This provides a removable self-contained damper cartridge which damps the movement of the front wheel relative to the vehicle.

20 Claims, 3 Drawing Sheets

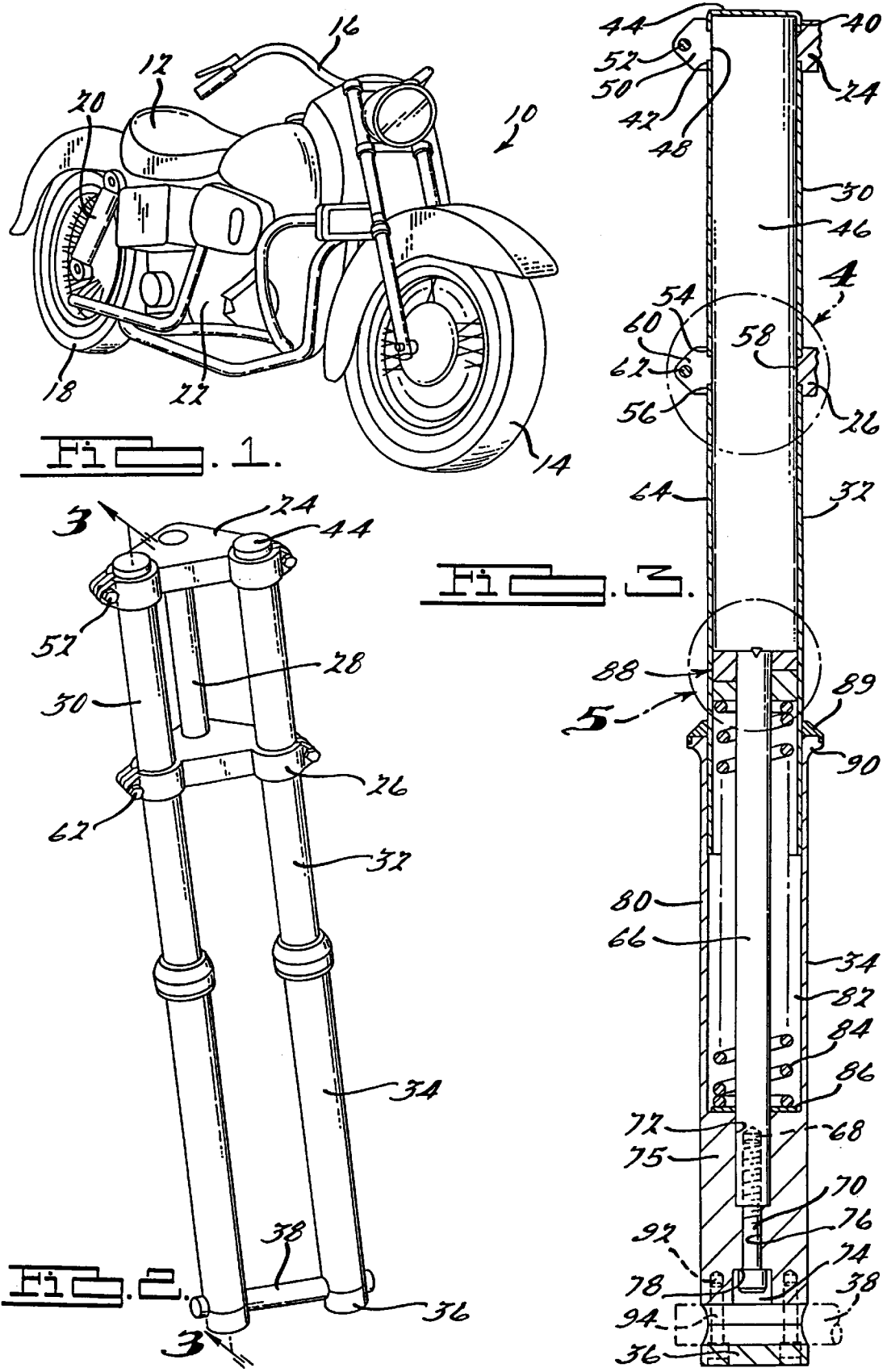

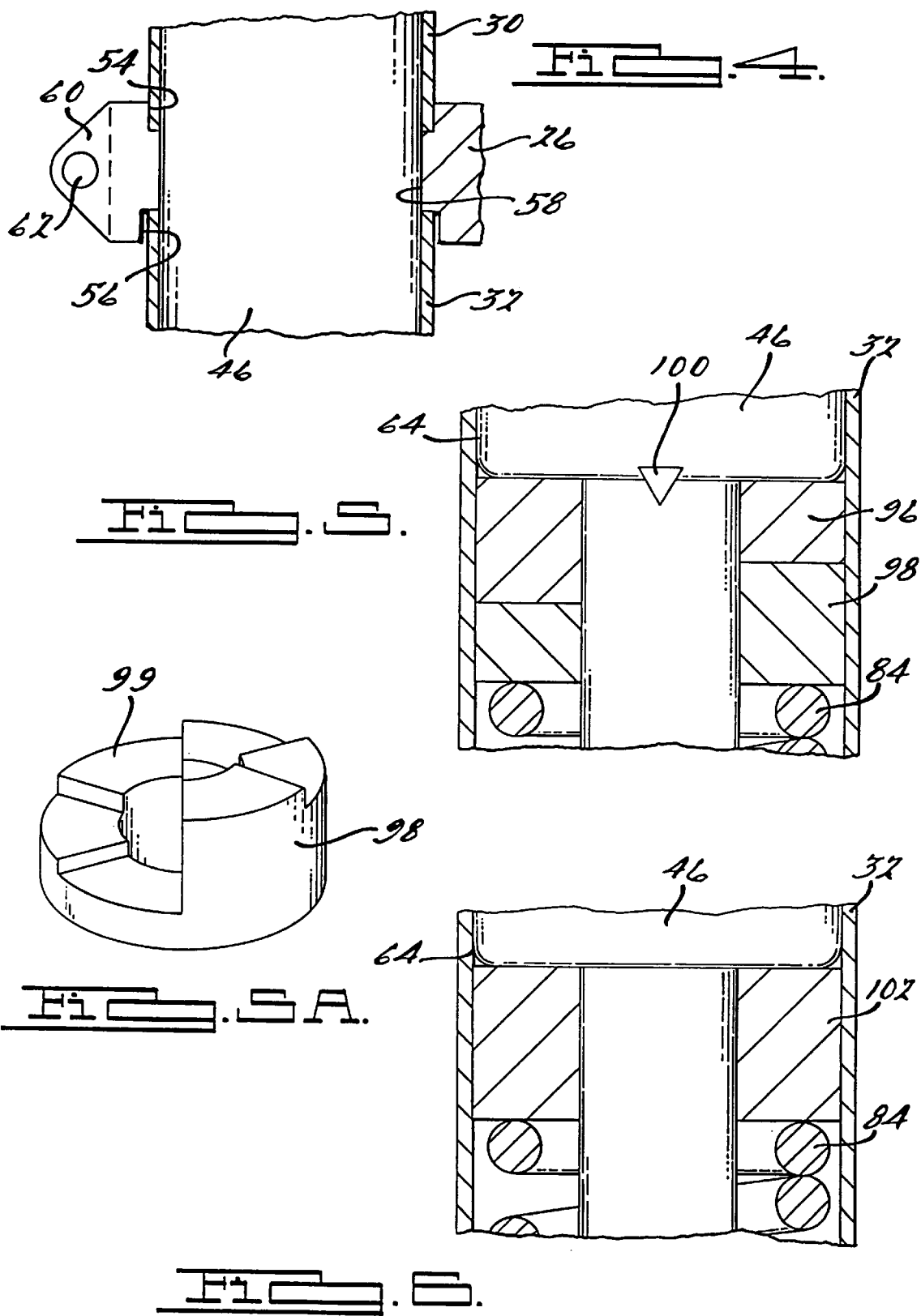

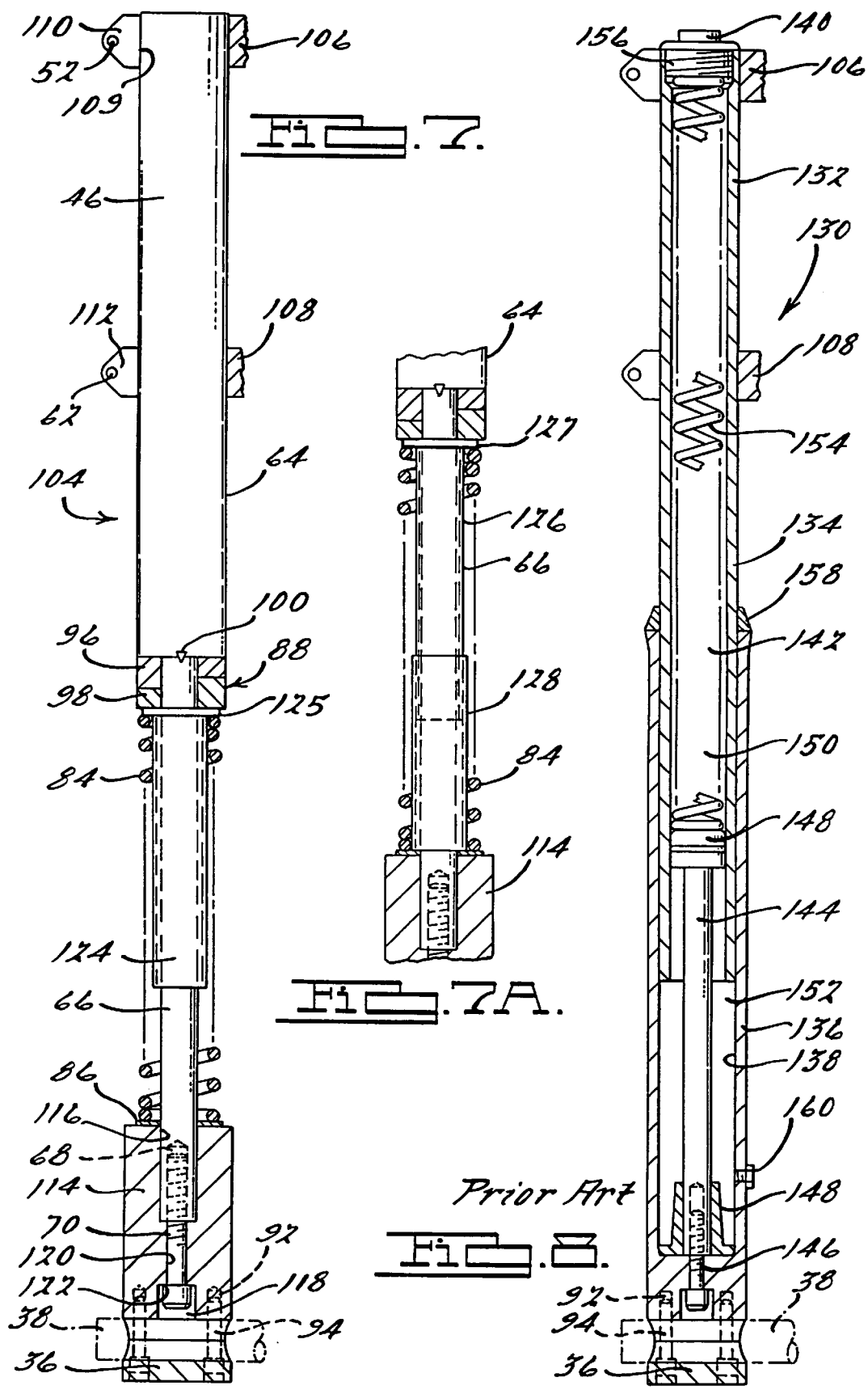

MODULAR TELESCOPIC FRONT FORK ASSEMBLY

This is a continuation application of United States patent application Ser. No. 08/589,034, filed Jan. 19, 1996, now U.S. Pat. No. 5,829,773, entitled "MODULAR TELESCOPIC FRONT FORK ASSEMBLY", and naming as the inventor Babak Rajaee.

BACKGROUND OF THE INVENTION

1. Field of the Invention

This invention relates generally to suspension systems for vehicles which receive mechanical shock, and more particularly, to a modular telescopic front fork assembly for a motorcycle.

2. Description of the Related Art

Telescopic front fork assemblies have been widely used as front suspension systems for vehicles generally having a single front wheel, such as motorcycles. Telescopic front fork assemblies typically have a single fork tube and a pair of sliders which are mounted to the front wheel, via axle mounting bosses. The fork tube slides axially and telescopically within the sliders to form a pair of hydraulic dampers. To damp unwanted vibrations, a pair of piston assemblies within the sliders are able to limit the flow of damping fluid within the telescopic front fork assembly. Because the piston assemblies are able to limit the flow of damping fluid as the fork tube extends within the sliders or extends out from the sliders, the telescopic front fork assembly is able to provide a dampening force which "smooths" or "dampens" vibrations transmitted from the front wheel to the body of the motorcycle.

Since the telescopic front fork assembly forms a pair of hydraulic dampers, a large number of additional components are also found within the telescopic front fork assembly. These components include pistons, seals, valves, guides, stops, springs and damping fluid. The additional components make the manufacturing and assembly of the telescopic front fork assembly quite complicated and expensive, as well as creates numerous quality control problems. Moreover, since the fork tube and the sliders must act as hydraulic cylinders, these components require extensive machining, grinding, polishing and plating. For instance, the inside of the sliders must be machined to receive and seal the fork tube and the outside of the fork tube must be machined, polished and plated to provide an effective seal with the sliders. Still further, since the telescopic front fork assembly contains numerous components including the damping fluid, the telescopic front fork assembly requires regular service and maintenance, including replacing the damping fluid.

What is needed then is a modular telescopic front fork assembly which does not suffer from the above-mentioned disadvantages. This will, in turn, reduce the number of components in the telescopic front fork assembly; reduce the unsprung front wheel weight; eliminate the required maintenance for the telescopic front fork assembly; decrease the number of service parts; reduce manufacturing costs while providing a simpler assembly; increase the quality of the telescopic front fork assembly; and provide an easily modified telescopic front fork assembly which is adaptable to a wide range of applications. It is, therefore, an object of the present invention to provide such a modular telescopic front fork assembly.

SUMMARY OF THE INVENTION

In accordance with the teachings of the present invention, a modular telescopic front fork assembly is disclosed. The modular telescopic front fork assembly is used to eliminate many of the disadvantages associated with the use of conventional telescopic front fork assemblies. This is basically achieved by providing a replaceable self-contained damper cartridge within the modular telescopic front fork assembly.

In one preferred embodiment, a modular telescopic front fork assembly for a front of a vehicle having at least one front wheel is disclosed. The modular telescopic front fork assembly includes a removable self contained damper having a housing and a reciprocating piston rod axially extending from the housing. A first securing mechanism steerably secures the housing of the removable self-contained damper to the front of the vehicle. A second securing mechanism secures the piston rod of the removable self-contained damper adjacent to the front wheel of the vehicle. This enables the removable self-contained damper to damp the relevant movement of the front wheel relative to the vehicle.

Use of the present invention provides a modular telescopic front fork assembly which reduces the number of components in the telescopic front fork assembly, reduces the unsprung front wheel weight, decreases the number of service parts, reduces manufacturing costs while increasing the quality and provides an easily modifiable telescopic front fork assembly which is adaptable to a wide range of applications. As a result, the aforementioned disadvantages associated with the current telescopic front fork assemblies have been substantially eliminated.

BRIEF DESCRIPTION OF THE DRAWINGS

Still other advantages will become apparent to those skilled in the art after reading the following specification and by reference to the following drawings in which:

FIG. 1 is a perspective view of a motorcycle having a modular telescopic front fork assembly of the present invention;

FIG. 2 is an enlarged perspective view of the modular telescopic front fork assembly;

FIG. 3 is a partial cross-sectional view of the modular telescopic front fork assembly taken along line 3—3 of FIG. 2;

FIG. 4 is an enlarged cross-sectional view of a triple clamp taken about line 4 of FIG. 3;

FIG. 5 is an enlarged cross-sectional view of an adjustable spring seat taken about line 5 of FIG. 3;

FIG. 5A is a perspective view of a portion of the adjustable spring seat of FIG. 5;

FIG. 6 is an enlarged cross-sectional view of a non-adjustable spring seat;

FIG. 7 is a partial cross-sectional view of another preferred embodiment of the modular telescopic front fork assembly;

FIG. 7A is a partial cross-sectional view of another preferred embodiment of a piston rod sleeve; and FIG. 8 is a partial cross-sectional view of a prior art telescopic front fork assembly.

DETAILED DESCRIPTION OF THE PREFERRED EMBODIMENT(S)

The following description of the preferred embodiments of the present invention are merely exemplary in nature and are in no way intended to limit the invention or its applications or uses. Moreover, while this invention is described in connection with a motorcycle, those skilled in the art would readily recognize that the modular telescopic front fork assembly can be utilized with various other vehicles which generally utilize a single front wheel, such as bicycles, motor scooters, three-wheel vehicles, all terrain vehicles (ATVs) and other types of vehicles.

Referring to FIG. 1, a modular telescopic front fork assembly 10 according to the preferred embodiment of the present invention is shown. The modular telescopic front fork assembly 10 is depicted in operative association with a diagrammatic representation of a conventional street motorcycle 12. While the motorcycle 12 has been depicted as a street motorcycle, the modular telescopic front fork assembly 10 may be used with other types of motorcycles, as well as other types of vehicles. The motorcycle 12 includes a front wheel 14 and handle bars 16 operatively connected to the modular telescopic front fork assembly 10 and a rear wheel 18 operatively connected to a rear suspension system 20. The modular telescopic front fork assembly 10 and the rear suspension system 20 serve to damp the relative movement of the unsprung portion (i.e., the modular telescopic front fork assembly 10 and the front wheel 14 and the rear suspension system 20 and the rear wheel 18) and the sprung portion (i.e., the body 22) of the motorcycle 12.

Turning to FIG. 2, an enlarged perspective view of the modular telescopic front fork assembly 10 is shown. The modular telescopic front fork assembly 10 comprises an upper triple clamp 24 and a lower triple clamp 26, each preferably constructed from cast aluminum or other suitable materials such as cast steel. The spaced apart upper and lower triple clamps 24 and 26 are secured to a steering stem 28 which pivotably or steerably secures the modular telescopic front fork assembly 10 to the motorcycle 12. Positioned between the upper and the lower triple clamps 24 and 26 are a pair of elongated tubular upper chrome covers 30 and positioned below the lower triple clamp 26 are a pair of elongated tubular lower chrome covers 32. Each triple clamp 24 and 26 includes clamping means for clamping and securing the upper and lower chrome covers 30 and 32.

The lower chrome covers 32 slidably engage a pair of elongated cylindrical sliders 34 preferably constructed of cast aluminum (SAE 326 T4) or other suitable materials. The lower chrome covers 32 slide within the sliders 34 as the modular telescopic front fork assembly 10 damps the relative movement of the wheel 14. The sliders 34 include a pair of front axle bosses 36 also preferably constructed of cast aluminum (SAE 326 T4) or other suitable materials. The front axle bosses 36 clampingly secure a front axle 38 on which the wheel 14 rotates. It should also be noted that the modular telescopic front fork assembly 10 is shown in FIG. 2 without fender and caliper mounting bosses which would simply be cast into the modular telescopic front fork assembly 10 in a conventional manner.

Referring now to FIG. 3, a partial cross-sectional view of the modular telescopic front fork assembly 10 taken along line 3—3 of FIG. 2 is shown. The upper triple clamp 24 includes an upper circular relief 40 and a lower circular relief 42. The upper circular relief 40 clampingly receives and secures a chrome end cap 44 and the lower circular relief 42 clampingly receives and secures the top of the elongated tubular upper chrome cover 30. A removable and replaceable self-contained strut or damper cartridge 46, which will be described in detail shortly, passes through the upper triple clamp 24 and is clampingly secured within the upper triple clamp 24, via side walls 48. The upper triple clamp 24 further includes a pinch bolt boss 50 operable to receive a bolt 52. Upon tightening the bolt 52, the chrome end cap 44, the strut cartridge 46, and the upper chrome cover 30 are clampingly secured within the upper triple clamp 24.

The lower triple clamp 26, shown enlarged in FIG. 4, also includes an upper circular relief 54 and a lower circular relief 56. The upper circular relief 54 clampingly receives and secures the bottom of the elongated tubular upper chrome cover 30 and the lower circular relief 56 which is slightly larger than the upper circular relief 54 receives and rotatably retains the top of the elongated tubular lower chrome cover 32. The strut cartridge 46 also passes through the lower triple clamp 26 and is clampingly secured within the lower triple clamp 26, via side walls 58. The lower triple clamp 26 further includes a pinch bolt boss 60 operable to receive a bolt 62. Upon tightening the bolt 62, the upper chrome cover 30 and the strut cartridge 46 are clampingly secured within the lower triple clamp 26 and the lower chrome cover 32 is rotatably retained within the relief 56.

The strut cartridge insert or damper 46 is removably secured in an inverted position and is a separate self-contained replaceable damper such as a Monroe UB 73274 strut cartridge or other suitable strut cartridge insert. The strut cartridge 46 includes an elongated cylindrical housing 64 and a reciprocating axially extending piston rod 66 concentric with the housing 64. Attached to one end of the piston rod 66 within the housing 64 is a reciprocating piston assembly (not shown). The reciprocating piston assembly is used to generate damping forces by restricting the flow of damping fluid contained within the housing 64 between an upper and lower portion of the housing 64. Located at the other end of the piston rod 66 is an axially extended internally threaded bore 68 which operatively receives a bolt 70.

To secure the piston rod 66 to the slider 34, the piston rod 66 is axially positioned within an elongated cylindrical bore 72 which is operable to snugly and removably receive and secure the end of the piston rod 66. The cylindrical bore 72 is of a sufficient depth to provide added rigidity and strength to the piston rod 66. Upon inserting the piston rod 66 within the cylindrical bore 72, the bolt 70 is passed through a cylindrical opening 74 and into an axially extending bore 76. As the bolt 70 is tightened within the threaded bore 68, the piston rod 66 is secured within a substantially cylindrical solid portion 75 of the slider 34 as the bolt 70 comes to rest upon a ledge 78.

The slider 34 includes a cylindrical wall 80 which forms a cylindrical chamber 82 operable to receive a portion of the lower chrome cover 32 and the strut cartridge housing 64 as the modular telescopic front fork assembly 10 reciprocates up and down generally between a range of about zero to six inches. Located within the cylindrical chamber 82 is the piston rod 66 and a suspension spring 84 located concentrically around the piston rod 66. The suspension spring 84 supports the weight of the motorcycle 12, while the strut cartridge 46 performs the damping function and guides the location of the front wheel 14 as it moves relative to the motorcycle 12. Either a variable rate spring or a uniform rate spring can be selected as the suspension spring 84 depending on the weight and performance requirements.

Located at the bottom of the spring 84 is a lower spring seat washer 86 which prevents chafing of the inside of the slider 34. Located at the top of the spring 84 is an adjustable upper spring seat assembly 88, which will be discussed in detail shortly. Positioned at the top of the slider 34 is a resilient dust seal or bushing 89 which snappingly or resiliently engages a ledge 90 of the slider 34. The dust seal 89 is used to prevent dust and debris from entering into the cylindrical chamber 82. However, it should be noted that the dust seal 89 does not need to act as a fluid or pressure seal, similar to when a conventional hydraulic damper is formed within two slidably related cylindrical tubes. Positioned at the bottom of the slider 34 or at the front axle boss 36 are a pair of threaded axle bores 92 operable to receive bolts 94. Upon tightening the bolts 94, the axle 38 is clampingly secured between the slider 34 and the front axle boss 36.

In order to provide a front spring preload adjustment, the adjustable upper spring seat assembly 88 includes an upper spring seat 96 and a lower spring seat 98, as shown in FIGS. 5 and 5A. The upper spring seat 96 is located and held in place within the lower chrome cover 32 using a locating tab 100 extending from the strut cartridge housing 64. The locating tab 100 engages the planner portion of the upper spring seat 96 which rests against the housing 64. The lower spring seat 98 is secured to the lower chrome cover 32 by spot welding or other suitable means prior to chroming the cover 32. The spring seats 96 and 98 include multiple notches or steps 99 (see FIG. 5A) which are used to adjust the front spring preload. As shown in FIG. 5A, the lower spring seat 98 includes six (6) steps 99 which enables three (3) front spring preload adjustments. One skilled in the art would also recognize that more or less steps 99 can be employed depending on the particular requirement.

To adjust the front spring preload, the rotatably retained lower chrome cover 32 is merely axially rotated within the relief 56. Upon grasping the lower chrome cover 32, the cover 32 is pushed downward against the spring tension and rotated clockwise so that the lower spring seat 98 rotates with respect to the upper spring seat 96 which is held in place, via the locating tab 100. By turning the cover 32, this enables the upper and lower spring seats 96 and 98 to rotate with respect to one another and separate, via the steps 99, thereby changing the height of the adjustable spring seat assembly 88 to either provide a firmer or a softer spring preload adjustment. One skilled in the art would also recognize that a threaded spring seat assembly may also be used in place of the stepped spring seats 96 and 98 to provide a spring preload adjustment.

Referring to FIG. 6, a non-adjustable spring seat 102 is shown. The non-adjustable spring seat 102 is positioned within the lower chrome cover 32 and against the strut cartridge housing 64, while the top of the spring 84 rests against the upper spring seat 102. Such a configuration provides a fixed spring preload. The locating tab 100 is optional with the non-adjustable spring seat 102 and may be employed so that only a single version of strut cartridge housing 64 is required. Moreover, it should be noted that the relief 56 would be of a smaller size as shown or the chrome cover 32 would be thicker so that the chrome cover 32 is clampingly secured within the relief 56.

In order to assemble the modular telescopic front fork assembly 10 or replace the strut cartridge 46, the piston rod 66 is first disconnected from the slider 34 upon removing the bolt 70 from the piston rod 66. The upper triple clamp 24 and the lower triple clamp 26 are loosened, via bolts 52 and 62 within the pinch bolt bosses 50 and 60. The strut cartridge insert 46 is slidably removed from the upper and lower triple clamps 24 and 26 by removing the chrome cap 44 and sliding the strut cartridge 46 downward through the triple clamps 24 and 26. A new strut cartridge 46 is then slidably inserted upward into the upper and lower triple clamps 24 and 26. The chrome cap 44 is inserted into relief 40 and the cap 44, covers 30 and 32 and the strut cartridge 46 are clampingly secured and retained, via the pinch bolt bosses 50 and 60 and bolts 52 and 62. The piston rod 66 is finally secured to the slider 34, via the bolt 70.

In this way, the strut cartridge insert 46 can be easily replaced to service the modular telescopic front fork assembly 10. The strut cartridge insert 46 will generally require replacement about every 6,000 to 12,000 miles of use. In addition, the damping characteristics and performance of the modular telescopic front fork assembly 10 can be changed by merely inserting a different type cartridge insert 46 or spring 84. For instance, variable rate damping springs, different types of strut cartridge inserts (i.e. gas charged or fluid) and adjustable damping inserts can all be used to tailor the modular telescopic front fork assembly 10 to a large variety of applications.

Referring now to FIG. 7, another preferred embodiment of the modular telescopic front fork assembly 104 is shown in partial cross-section. In this regard, like reference numerals will be used to reference similar elements which have been described in connection with the first preferred embodiment of the present invention. The modular telescopic front fork assembly 104 includes an upper triple clamp 106 and a lower triple clamp 108 which clampingly or removably secures the strut cartridge insert 46. The upper triple clamp 106 and the lower triple clamp 108 are substantially similar to the triple clamps 24 and 26, except that the upper and lower triple clamps 106 and 108 do not contain any reliefs 40, 42, 54, 56 and merely contain a single sidewall 109 operable to clampingly secure the housing 64 of the cartridge insert 46. The reliefs 40, 42, 54 and 56 have been eliminated from the upper and lower triple clamps 106 and 108 because the chrome covers 30 and 32 are not employed in this embodiment. Here again, the housing 64 is clampingly and removably secured within the upper and lower triple clamps 106 and 108, via pinch bolt bosses 110 and 112 which are operable to receive bolts 52 and 62.

The axially extending piston rod 66 is removably secured to a mounting member, clevis or knuckle 114 by inserting the end of the piston rod 66 into a cylindrical bore 116. The bolt 70 is then passed through a cylindrical opening 118 and into an axially extending bore 120. As the bolt 70 is tightened within the threaded bore 68, the piston rod 66 is secured within the mounting member 114 as the bolt 70 comes to rest upon a ledge 122. Positioned at the bottom of the mounting member 114 is the front axle boss 36 having the pair of threaded axial bores 92 which axially extend within the mounting member 114 and receive bolts 94.

Positioned atop the mounting member 114 is the lower spring seat washer 86. Positioned below the housing 64 of the strut cartridge 46 is the adjustable upper spring seat assembly 88, as shown in FIGS. 5 and 5A. Located concentrically and about the piston rod 66 is the suspension spring 84 which is not covered by the cylindrical wall 80 but left exposed. Also positioned about and concentric with the piston rod 66 is a teflon sleeve 124 which has a lip 125. The lip 125 retains the teflon sleeve 124 against the lower spring seat 98, via the suspension spring 84. The teflon sleeve 124 acts to center the suspension spring 84 about the piston rod 66. The teflon sleeve 124 also reduces any audible noise which may be generated from the spring 84 striking the piston rod 66 as the modular telescopic front fork assembly 104 reciprocates up and down. It should be noted that the teflon sleeve 124 does not extend along the entire length of the piston rod 66 and has a length which permits up to about six inches of travel as the piston rod 66 reciprocates in and out of the housing 64. Moreover, while the sleeve 124 is shown used with the modular telescopic front fork assembly 104, those skilled in the art would realize that the sleeve 124 could also be used with the modular telescopic front fork assembly 10.

Referring to FIG. 7A, a pair of teflon sleeves 126 and 128 are shown which slidably engage one another to provide for the travel up to about six inches. In this embodiment, the upper sleeve 126 includes a lip 127 which is used to retain the sleeve 126 against the lower spring seat 98 while the sleeve 128 freely slides along the piston rod 66. This configuration allows for centering of the suspension spring 84 about the entire length of the piston rod 66.

The modular telescopic front fork assembly 104, as shown in FIG. 7, would normally be utilized when a full dresser front end is installed on the motorcycle 12. By utilizing a typical full dresser front end, this would cover the modular telescopic front fork assembly 104, thereby eliminating the need for utilizing the chrome covers 30 and 32, as well as the chrome end cap 44, since these components are used for aesthetic purposes only. Moreover, one skilled in the art would also recognize that the housing 64 of the strut cartridge insert 46 can merely be chromed in place of using the chrome covers 30 and 32. However, this would add additional cost to the strut cartridge 46.

To adjust the front spring preload, the lower spring seat 98 is grasped with a suitable tool and pushed downward against the spring tension while concurrently being rotated clockwise. This enables the lower spring seat 98 to rotate with respect to the upper spring seat 96 to separate one another, via the steps 99, thereby changing the height of the adjustable spring seat assembly 88 to either provide a firmer or softer spring preload adjustment.

Referring to FIG. 8, a partial cross-sectional view of a conventional telescopic front fork assembly 130 is shown. The telescopic front fork assembly 130 includes a cylindrical fork tube 132 having a hardened chromed and machined outer surface 134 which slidably engages a pair of cast aluminum sliders 136 having a machined polished interior surface 138. The fork tube 132 is secured, via the upper and lower triple clamps 106 and 108. The sliders 136 secure the axle 38, via the front axle mounting boss 36, using the pair of threaded axle bores 92 operable to receive bolts 94. The fork tube 132, the slider 136 and a fork tube cap 140 defines a damping fluid-containing working chamber 142.

Located within the working chamber 142 is a piston rod 144 having one end secured to the bottom of the slider 136 with a piston rod bolt 146. A piston rod bushing 148 is used to receive the end of the piston rod 144, as well as provide additional support for the piston rod 144. A piston assembly 148 is secured to the other end of the piston rod 144 which is used to restrict the flow of damping fluid between an upper portion 150 and a lower portion 152 of the working chamber 142. Located atop the piston assembly 148 is a fork spring 154 which is used to support the weight of the motorcycle 12. Located atop the fork spring 154 is an upper spring seat bushing 156 which seats the fork spring 154, as well as seals the fork tube cap 140 relative to the fork tube 132. In order to provide a fluid seal between the fork tube 132 and the slider 136, a wiper seal assembly 158 comprising multiple seals fluidly seals the outer surface 134 of the fork tube 132 relative to the internal surface 138 of the slider 136.

In order for the fork tube 132 and the slider 136 to form a hydraulic cylinder, the fork tube 132 requires extensive machining, plating and polishing to the outer surface 134, while the inner surface 138 of the slider 136 also requires extensive machining, so that the surfaces 134 and 138 provide a sufficient seal, as the fork tube 132 slidably engages the slider 136.

In operation, the telescopic front fork assembly 130 reciprocates up and down as the fork tube 132 slides within the slider 136. This allows the piston assembly 148, which is set at a fixed position, to restrict the flow of damping fluid between the upper portion 150 and the lower portion 152 of the working chamber 142 to provide a dampening force. Because the telescopic front fork assembly 130 includes numerous serviceable parts including the piston assembly 148, seals, valves and other components (not shown), the telescopic front fork assembly 130 requires regular maintenance and service, including draining and refilling the damping fluid from within the working cylinder 142 utilizing a drain plug 160. The service is generally required every 3,000 to 12,000 miles of use.

Upon comparing the modular telescopic front fork assemblies 10 and 104 to the conventional telescopic front fork assembly 130, numerous advantages can be readily observed. First, the modular telescopic front fork assemblies 10 and 104 utilize a self-contained inverted strut cartridge 46 which eliminates the need for servicing internal components such as the piston assembly 148, as well as eliminating having to change the damping fluid. Second, since the strut cartridge insert 46 is used as the damper, there is no need for the slider 34 in combination with the upper and lower chrome covers 30 and 32 to form a hydraulic cylinder similar to the slider 136 and the fork tube 132. This eliminates the need for performing extensive machining, plating and polishing of these components which is required for the fork tube 132 and the slider 136. Third, since the weight of the modular telescopic front fork assemblies 10 and 104 are primarily located in the strut cartridge insert 46 and the strut cartridge insert 46 is held and secured in an inverted position, this reduces the unsprung weight (i.e. spring 84, slider 34, axle 28, tire 14), thereby providing quicker suspension response and performance. In contrast, the conventional telescopic front fork assembly 130 has most of its weight in the bottom of the slider 136, thereby increasing the unsprung weight and reducing the responsiveness and performance of the telescopic front fork assembly 130.

Still further, it should be noted that the chrome covers 30 and 32, as well as the chrome end cap 44, are used only for aesthetic purposes. Thus, they may be eliminated when a full dresser front end is utilized with the motorcycle 12, which covers the modular telescopic front fork assembly 104. In contrast, regardless of whether or not a full dresser front end is used, the conventional telescopic front fork assembly 130 still requires the chromed, polished and plated surfaces to form the hydraulic cylinder for sealing purposes. Finally, because the modular telescopic front fork assembly 10 does not require that the chrome covers 30 and 32 seal with the slider 34, the chrome plating on the covers 30 and 32 are of a higher quality and has a better appearance than the conventional fork tube 132, since the chrome fork tube 132 must be slightly coarse to provide sealing within the slider 136.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A modular telescopic front fork assembly for a front of a vehicle having at least one front wheel, said modular telescopic front fork assembly comprising:

a removable self-contained damper having a substantially fluid sealed housing and a reciprocating piston rod axially extending from said substantially fluid sealed housing, said removable self-contained damper operable to damp the relative movement of the front wheel relative to the vehicle;

a first securing mechanism operable to removably and steerably secure said substantially fluid sealed housing of said removable self-contained damper to the front of the vehicle, said first securing mechanism including a sidewall that clampingly engages said substantially fluid sealed housing; and a second securing mechanism operable to removably secure one end of said piston rod of said removable self-contained damper adjacent to the front wheel of the vehicle, wherein said removable self-contained damper is operable to be readily replaced to meet a wide range of applications and is secured in an inverted position with said one end of said piston rod being adjacent to the front wheel of the vehicle to provide improved suspension response.

2. The modular telescopic front fork assembly as defined in claim 1 further comprising a suspension spring positioned about and concentric with said reciprocating piston rod.

3. The modular telescopic front fork assembly as defined in claim 2 further comprising an adjustable spring seat assembly for adjusting a suspension spring preload.

4. The modular telescopic front fork assembly as defined in claim 3 wherein said adjustable spring seat assembly includes an upper spring seat and a lower spring seat each having step portions operable to permit multiple spring preload adjustments.

5. The modular telescopic front fork assembly as defined in claim 4 further comprising a cover for covering a portion of said housing of said removable self-contained damper, whereupon rotating said substantially fluid sealed housing, said lower spring seat is rotated to permit multiple spring preload adjustments.

6. The modular telescopic front fork assembly as defined in claim 1 where in said first securing mechanism includes a first triple clamp for removably clamping said substantially fluid sealed housing of said removable self-contained damper.

7. The modular telescopic front fork assembly as defined in claim 6 wherein said first securing mechanism further includes a second triple clamp for removably clamping said substantially fluid sealed housing of said removable self-contained damper.

8. The modular telescopic front fork assembly as defined in claim 6 wherein said first triple clamp includes a first cylindrical relief for removably clamping a first cover and a second cylindrical relief for rotatably retaining a second cover, said first and second covers covering said substantially fluid sealed housing of said removable self-contained damper.

9. The modular telescopic front fork assembly as defined in claim 1 wherein said second securing mechanism includes a cylindrical slider having a cylindrical chamber operable to receive a portion of said substantially fluid sealed housing and a cylindrical bore operable to removably receive and secure one end of said piston rod adjacent to the front wheel of the vehicle.

10. A modular telescopic front fork assembly for a front wheel of a motorcycle, said modular telescopic front fork assembly comprising:

a replaceable self-contained damper cartridge operable to damp the relative movement of the front wheel relative to the motorcycle, said replaceable self-contained damper cartridge having a cylindrical housing and a reciprocating piston rod axially extending from said cylindrical housing, said cylindrical housing being substantially fluid sealed;

a clamp operable to be steerably secured to the motorcycle, said clamp removably securing said cylindrical housing of said replaceable self-contained damper cartridge by clampingly engaging said cylindrical housing with a sidewall of said clamp; and a cylindrical slider having a wall defining a chamber and a bore, said chamber operable to receive a portion of said cylindrical housing and a portion of said piston rod and said bore operable to removably receive and secure one end of said piston rod adjacent to the front wheel, wherein said replaceable self-contained damper cartridge is removably secured in an inverted position to reduce an unsprung weight of said modular telescopic front fork assembly to provide improved suspension response.

11. The modular telescopic front fork assembly as defined in claim 10 further comprising a first cover and a second cover, said first and second covers covering said cylindrical housing of said replaceable self-contained damper cartridge and clampingly retained by a first and a second cylindrical relief in said clamp.

12. The modular telescopic front fork assembly as defined in claim 11 wherein said modular telescopic front fork assembly further comprises a suspension spring positioned about and concentric with said reciprocating piston rod.

13. The modular telescopic front fork assembly as defined in claim 12 further comprising an adjustable spring seat assembly for adjusting a suspension spring preload.

14. The modular telescopic front fork assembly as defined in claim 13 wherein said adjustable spring seat assembly includes an upper spring seat and a lower spring seat each having step portions operable to permit multiple spring preload adjustments.

15. The modular telescopic front fork assembly as defined in claim 14 wherein said lower spring seat is secured to said second cover, whereby upon rotating said second cover, said lower spring seat is adjusted relative to the upper spring seat to permit multiple spring preload adjustments.

16. A modular telescopic front fork assembly for a front wheel of a motorcycle having a first triple clamp and a second triple clamp, said modular telescopic front fork assembly comprising:

a first removable self-contained strut cartridge having a first substantially fluid sealed housing and a first reciprocating piston rod axially extending from said first substantially fluid sealed housing, said first substantially fluid sealed housing of said first removable self-contained strut cartridge operable to be clampingly engaged and received within sidewalls of the first and second triple clamps and operable to damp the relative movement of the front wheel relative to the motorcycle;

a second removable self-contained strut cartridge having a second substantially fluid sealed housing and a second reciprocating piston rod axially extending from said second substantially fluid sealed housing, said second substantially fluid sealed housing of said second removable self-contained strut cartridge operable to be clampingly engaged and received within sidewalls of the first and second triple clamps and operable to damp the relative movement of the front wheel relative to the motorcycle;

a first mounting member having a first bore which receives one end of said first piston rod and operable to removably secure said one end of said first piston rod adjacent to the front wheel; and a second mounting member having a second bore which receives one end of said second piston rod and operable to removably secure said one end of said second piston rod adjacent to the front wheel, wherein said first and second removable self-contained strut cartridges are mounted in an inverted position to reduce an unsprung weight of said modular telescopic front fork assembly and provide improved suspension response and performance.

17. The modular telescopic front fork assembly as defined in claim 16 further comprising a first suspension spring positioned about and concentric with said first piston rod and a second suspension spring positioned about and concentric with said second piston rod.

18. The modular telescopic front fork assembly as defined in claim 17 further comprising a first adjustable spring seat assembly and a second adjustable spring seat assembly, said first adjustable spring seat assembly operable to adjust a spring preload of said first suspension spring and said second adjustable spring seat assembly operable to adjust a spring preload of said second suspension spring.

19. The modular telescopic front fork assembly as defined in claim 17 further comprising a first sleeve positioned about said first piston rod for centering said first suspension spring about said first piston rod and for reducing any audible noise of said first suspension spring striking said first piston rod.

20. The modular telescopic front fork assembly as defined in claim 16 wherein said first substantially fluid sealed housing and said second substantially fluid sealed housing are each chrome plated.

* * * * *